(12) United States Patent
Yang (10) Patent No.: US 12,306,796 B2
(45) Date of Patent: May 20, 2025

(54) DATA PROCESSING METHOD AND ELECTRONIC DEVICE

(71) Applicant: Lenovo (Beijing) Limited, Beijing (CN)

(72) Inventor: Shuaizheng Yang, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 223 days.

(21) Appl. No.: 17/691,738

(22) Filed: Mar. 10, 2022

(65) Prior Publication Data

US 2023/0068942 A1  Mar. 2, 2023

(30) Foreign Application Priority Data

Aug. 31, 2021  (CN) .......................... 202111011448.X (51) Int. Cl.
  *G06F 16/17*  (2019.01)
  *G06F 16/174*  (2019.01)
(52) U.S. Cl.
  CPC ................. *G06F 16/1744* (2019.01)
(58) Field of Classification Search
  CPC ... G06F 16/1744; G06F 3/0608; G06F 16/174
  USPC ....................................................... 707/693
  See application file for complete search history.

(56) References Cited

U.S. PATENT DOCUMENTS

| | | | | |
|---|---|---|---|---|
| 5,467,087 A | * | 11/1995 | Chu ..................... | H03M 7/3086 341/86 |
| 8,417,833 B1 | * | 4/2013 | Amdahl .................. | H04L 69/04 711/170 |
| 8,502,707 B2 | * | 8/2013 | Fallon ................. | H03M 7/4006 341/51 |
| 9,571,698 B1 | * | 2/2017 | Wallace ................... | H04N 1/41 |
| 10,203,897 B1 | * | 2/2019 | Cheah ..................... | G06F 3/061 |
| 10,382,751 B1 | * | 8/2019 | Zhao ..................... | H04N 19/105 |
| 11,216,186 B1 | * | 1/2022 | Armangau ............ | G06F 3/0689 |
| 11,347,409 B1 | * | 5/2022 | Randolph ............... | G06F 3/065 |
| 11,481,114 B2 | * | 10/2022 | Mizushima ........... | G06F 3/0679 |
| 2002/0078241 A1 | * | 6/2002 | Vidal ...................... | H04L 69/04 709/231 |
| 2005/0210054 A1 | * | 9/2005 | Harris ..................... | G06F 16/10 |
| 2009/0328143 A1 | * | 12/2009 | Ming ................. | H04N 1/32283 726/2 |
| 2011/0082377 A1 | * | 4/2011 | Mahajan .............. | A61N 1/3702 711/E12.001 |

(Continued)

*Primary Examiner* — Hicham Skhoun
(74) *Attorney, Agent, or Firm* — ANOVA LAW GROUP, PLLC (57) ABSTRACT

A data processing method includes: determining a first parameter of a first data file; determining a compression strategy for compressing the first data file according to the first parameter; and compressing the first data file according to the compression strategy, where the first parameter includes at least one of: a length of time during which the first data file remains unexecuted while the electronic device running, an immediacy of the first data file, and a size of the first data file. The present disclosure also provides an electronic device. With the data processing method and electronic device provided by the present disclosure, data may be compressed more efficiently and more content space may be saved without affecting the use of other data files.

19 Claims, 7 Drawing Sheets

(56) References Cited

U.S. PATENT DOCUMENTS

| | | | |
|---|---|---|---|
| 2011/0145486 A1* | 6/2011 | Owa | G06F 12/0246 |
| | | | 711/E12.008 |
| 2011/0167173 A1* | 7/2011 | Bansal | H03M 7/30 |
| | | | 709/247 |
| 2012/0039534 A1* | 2/2012 | Malik | H03M 7/3064 |
| | | | 382/173 |
| 2013/0179410 A1* | 7/2013 | Amit | G06F 3/0683 |
| | | | 707/693 |
| 2014/0235975 A1* | 8/2014 | Carnes | G16H 40/67 |
| | | | 600/323 |
| 2014/0351229 A1* | 11/2014 | Gupta | G06N 20/00 |
| | | | 707/693 |
| 2016/0294409 A1* | 10/2016 | Nam | H03M 7/6011 |
| 2016/0344646 A1* | 11/2016 | Wang | H04L 47/38 |
| 2017/0090775 A1* | 3/2017 | Kowles | G06F 3/0608 |
| 2017/0264311 A1* | 9/2017 | Miyamae | H03M 7/3086 |
| 2019/0235758 A1* | 8/2019 | Constantinescu | G06F 3/0643 |
| 2019/0319635 A1* | 10/2019 | Katayama | H03M 7/6082 |
| 2020/0236317 A1* | 7/2020 | Kim | H04N 19/98 |
| 2021/0109781 A1* | 4/2021 | Ugale | G06F 9/4881 |
| 2021/0344549 A1* | 11/2021 | Babington | H03M 7/6082 |
| 2022/0179829 A1* | 6/2022 | Krasner | G06N 20/00 |
| 2023/0032590 A1* | 2/2023 | Tran | G06F 3/0631 |

\* cited by examiner

DATA PROCESSING METHOD AND ELECTRONIC DEVICE

RELATED APPLICATION(S)

This application claims priority to Chinese Patent Application No. 202111011448.X filed with the National Intellectual Property Administration, PRC on Aug. 31, 2021, which is incorporated herein by reference in entirety.

FIELD OF THE TECHNOLOGY

The present disclosure relates to the technical field of data compression, and in particular, to a data processing method and an electronic device.

BACKGROUND

With the development of information technology, the scale of data continues to expand, and the storage space required by electronic devices is also increasing. Therefore, it is increasingly desirable to propose a more efficient method of compressing data.

SUMMARY

The present disclosure provides a data processing method and an electronic device to solve some of the technical problems.

In one aspect, the present disclosure provides a data processing method, including: determining a first parameter of a first data file; determining a compression strategy for compressing the first data file according to the first parameter; compressing the first data file according to the compression strategy, where the first parameter includes at least one of: a length of time during which the first data file remains unexecuted while an electronic device is running, an immediacy of the first data file, and a size of the first data file.

In certain embodiment(s), the compression strategy is a strategy for compressing the first data file with different compression ratios and/or frequencies according to the first parameter of the first data file.

In certain embodiment(s), determining the compression strategy for compressing the first data file according to the first parameter includes: according to the length of time during which the first data file remains unexecuted while the electronic device is running, compressing the first data file by using different compression ratios, the longer the length of time during which the first data file remains unexecuted, the higher the compression ratio.

In certain embodiment(s), determining the compression strategy for compressing the first data file according to the first parameter includes: according to the immediacy of the first data file, compressing the first data file using different compression ratios and/or compression frequencies, the higher the immediacy of the first data file, the lower the compression ratio and/or the compression frequency.

In certain embodiment(s), determining the compression strategy for compressing the first data file according to the first parameter includes: according to the size of the first data file, compressing the first data file with different compression frequencies and/or compression frequencies, the larger the size of the first data file, the higher the compression frequency and/or the compression ratio.

In certain embodiment(s), determining the compression strategy for compressing the first data file according to the first parameter includes: determining whether the immediacy of the first data file is at a first level, compressing the first data file with a first compression strategy; and in response to determining the immediacy of the first data file is not at the first level, determining a compression frequency corresponding to the first data file according to the size of the first data file; determining a compression ratio of the first data file according to the length of time during which the first data file remains unexecuted while the electronic device is running; and determining a second compression strategy for compressing the first data file according to the compression ratio and the compression frequency.

In certain embodiment(s), determining the compression strategy for compressing the first data file according to the first parameter includes: determining whether the immediacy of the first data file is at a first level, compressing the first data file with a first compression strategy; and in response to determining the immediacy of the first data file is not at the first level, determining a compression frequency of the first data file according to the immediacy of the first data file; determining a compression ratio of the first data file according to the length of time during which the first data file remains unexecuted while the electronic device is running and according to the size of the first data file; and determining a second compression strategy for compressing the first data file according to the compression frequency and the compression ratio.

In certain embodiment(s), determining the compression strategy for compressing the first data file according to the first parameter includes: determining whether the immediacy of the first data file is at a first level, compressing the first data file with a first compression strategy; and in response to determining the immediacy of the first data file is not at the first level, determining a compression frequency corresponding to the first data file according to the immediacy of the first data file and according to the size of the first data file; determining a compression ratio of the first data file according to the length of time during which the first data file remains unexecuted while the electronic device is running; and determining a second compression strategy for compressing the first data file according to the compression frequency and the compression ratio.

In certain embodiment(s), the data processing method is applied to a compact operating system (Compact OS).

In another aspect, the present disclosure provides an audio processing apparatus, the audio processing apparatus including: a memory storing computer program instructions; and a processor coupled to the memory and configured to execute the computer program instructions and perform: determining a first parameter of a first data file; determining a compression strategy for compressing the first data file according to the first parameter; and compressing the first data file according to the compression strategy, where the first parameter includes at least one of: a length of time during which the first data file remains unexecuted while an electronic device is running, an immediacy of the first data file, and a size of the first data file.

In yet another aspect, the present disclosure provides a non-transitory computer-readable storage medium storing computer program instructions executable by at least one processor to perform: determining a first parameter of a first data file; determining a compression strategy for compressing the first data file according to the first parameter; and compressing the first data file according to the compression strategy, where the first parameter includes at least one of: a length of time during which the first data file remains unexecuted while an electronic device is running, an immediacy of the first data file, and a size of the first data file.

In yet another aspect, present disclosure provides an electronic device, the electronic device includes a determining module for determining the first parameter of the first data file, a processing module for determining the compression strategy to compress the first data file according to the first parameter, and a compressing module for compressing the first data file according to the compression strategy, where the first parameter includes at least one of: a length of time during which the first data file remains unexecuted while an electronic device is running, an immediacy of the first data file, and a size of the first data file By a data processing method disclosed in the present disclosure, the first parameter of the first data file is determined; the compression strategy for compressing the first data file is determined according to the first parameter; the first data file is compressed according to the compression strategy, where, the first parameter includes at least one of: the length of time during which the first data file remains unexecuted or not executed while the electronic device is running, the immediacy of the first data file, and the size of the first data file. Data may be compressed more efficiently and more space may be saved without impacting usage.

DETAILED DESCRIPTION

In order to make the purpose, feature and advantage of the present disclosure more understandable, as shown below in conjunction with the accompanying drawings in the embodiment(s) of the present disclosure, the technical solutions in the embodiment(s) of the present disclosure are described, The described embodiments are only some, but not all, embodiments of the present disclosure. According to the embodiment(s) in the present disclosure, other embodiments obtained by those skilled in the art without creative work shall fall within the protection scope of the present disclosure.

Compact operating system (Compact OS) is a way for Microsoft (MS) to deploy Windows 10 on tablet PCs or hardware with smaller hard drives. The purpose of Compact OS (Operating System, OS) is to save space. After deploying the OS according to certain related technologies, the occupancy of Windows 10 on the C drive is about 28 G, and after deploying the OS through Compact, the occupancy of Windows 10 on the C drive is about 25 G. Therefore, deploying Windows 10 through Compact can save about 3 G in C drive occupancy, in comparison to certain related technologies. However, for a tablet computer whose hard disk memory is 64 G or 128 G, the space of about 3 G is not very objective. It should be noted that Windows 10 is only an example, and the data processing method provided in the present disclosure can be applied to operating systems in related technologies, and can also be applied to operating systems developed later.

Therefore, in view of the defects existing in the data compression method in certain related technologies, the present disclosure provides a data processing method, which can overcome some or all of the defects in the related technologies.

Figure 1:
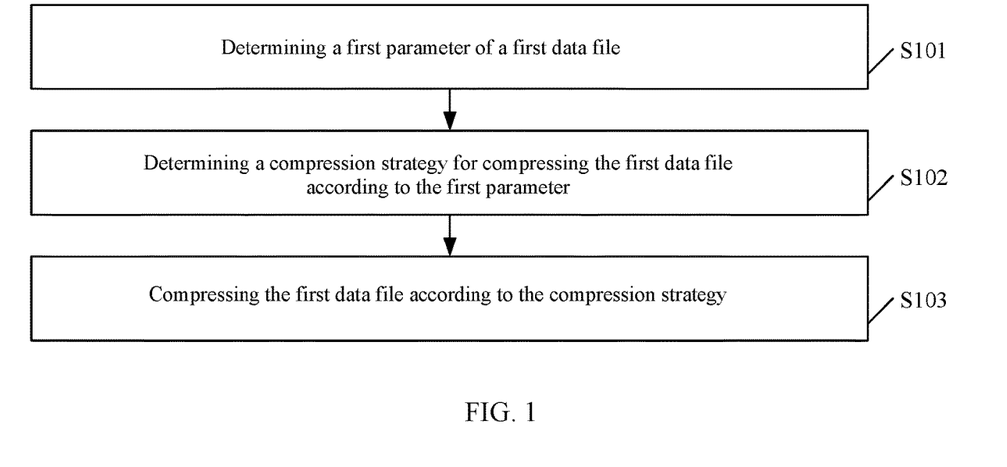
FIG. 1 is a schematic diagram of a flowchart of a data processing method according to embodiment(s) of the present disclosure.

FIG. 1 is a schematic diagram of a first optional flowchart of the data processing method according to embodiment(s) of the present disclosure, which will be described according to each step.

Step S101, determining a first parameter of a first data file.

In certain embodiment(s), an electronic device determines the first parameter of the first data file. The first data file may be a file in a system disk (for example, a C disk); the first data file may be at least one of a third-party application program (Application, APP), an inbox APP, a driver file, and a data file.

In certain embodiment(s), the electronic device determines a first parameter of the first data file, where the first parameter may include at least one of: a length of time during which the first data file remains unexecuted while an electronic device is running, an immediacy of the first data file, and a size of the first data file.

The length of time during which the first data file remains unexecuted while an electronic device is running may refer to a time interval between a last use of the first data file and a current time, while the electronic device is powered on. The size of the first data file may refer to a size of the memory occupied by the first data file. The immediacy of the first data file may refer to a response rate of the first data file. If the immediacy of the first data file is relatively higher, a response rate may need to be relatively faster when the first data file is called. The immediacy of the first data file may be according to a type of the first data file.

Step S102, determining a compression strategy for compressing the first data file according to the first parameter.

In certain embodiment(s), the electronic device determines a compression strategy for compressing the first data file according to the first parameter. The compression strategy is a strategy for compressing the first data file with different compression ratios and/or frequencies according to the first parameter of the first data file.

In implementations, the electronic device may determine a compression strategy for compressing the first data file according to one parameter; may also determine a compression strategy for compressing the first data file according to two parameters; or may determine a compression strategy according to three parameters for compressing the first data file. When the first parameter is different, the compression ratio and/or frequency are also different.

Step S103, compressing the first data file according to the compression policy.

In certain embodiment(s), the electronic device compresses the first data file according to the compression strategy determined at step S102.

In this way, by using the data processing method provided according to embodiment(s) of the present disclosure, the first parameter of the first data file is determined; the compression strategy for compressing the first data file is determined according to the first parameter. The first data file is compressed according to the compression strategy. The first parameter may include at least one of: the length of time during which the first data file remains unexecuted while the electronic device is running, the immediacy of the first data file, and the size of the first data file. Accordingly, without needing a compromise in use, the data may be compressed more efficiently and more content space may be saved.

Figure 2:
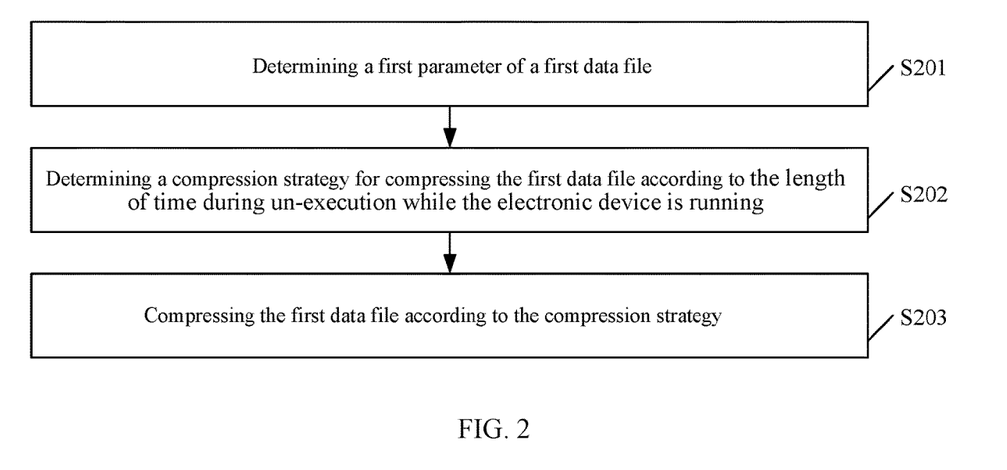
FIG. 2 is a schematic diagram of a flowchart of a data processing method according to embodiment(s) of the present disclosure.

FIG. 2 is a schematic flowchart of the data processing method provided according to embodiment(s) of the present disclosure, which will be described according to each step.

Step S201, determining the first parameter of the first data file.

In certain embodiment(s), the electronic device determines the first parameter of the first data file. The first data file may be a file in a system disk (for example, a C disk); the first data file may be at least one of a third-party APP, an inbox APP, a driver file, and a data file.

In certain embodiment(s), the electronic device determines the first parameter of the first data file, where the first parameter may include a length of time during which the first data file remains unexecuted while the electronic device is running.

The length of time for un-execution while the electronic device is running may be the time interval from the last use of the first data file to the current time when the electronic device is powered on.

Step S202, determining a compression strategy for compressing the first data file according to the length of time during which the first data file remains unexecuted while the electronic device is running.

In certain embodiment(s), the electronic device determines a compression strategy for compressing the first data file according to the length of time during which the first data file remains unexecuted while the electronic device is running. A data file is compressed by using different compression ratios. The longer the length of time during which the first data file remains unexecuted, the higher the compression ratio.

In implementations, the electronic device may use a currently determined compression strategy to compress the first data file on the basis of a previous compression.

For example, the length of time during which the first data file remains unexecuted while the electronic device is running is a first length of time, and the electronic device may compress the first data file by using a second compression strategy. The length of time during which the first data file remains unexecuted while the electronic device is running is a second length of time, and the electronic device may compress the first data file by using a third compression strategy, that is, to further compress the first data file that has already been compressed using the second compression strategy. The length of time during which the first data file remains unexecuted while the electronic device is running is a third length of time, and the electronic device may compress the first data file by using a fourth compression strategy, that is, to further compress the first data file that has already been compressed using the second compression strategy and the third compression strategy. The first duration is smaller than the second duration, and the second duration is smaller than the third duration, which may be expressed as "the first duration<second duration<the third duration." The compression ratio corresponding to the second compression strategy is smaller than the compression ratio corresponding to the third compression strategy, and the compression ratio corresponding to the third compression stagey is smaller than the compression ratio corresponding to the fourth compression strategy, which may be expressed as "the compression ratio corresponding to the second compression strategy<the compression ratio corresponding to the third compression strategy<the compression ratio corresponding to the fourth compression strategy."

Step S203, compressing the first data file according to the compression strategy.

In certain embodiment(s), before compressing the first data file, the electronic device may further determine a current size of the first data file, and if the first data file is smaller than a first threshold, then the first data file is not compressed. And/or, the electronic device determines a current compression ratio of the first data file; if the current compression ratio of the first data file is a second compression ratio, the first data file is not compressed. To prevent the first data file from being compressed to a certain size, it is unnecessary to continue to perform compression, which may otherwise waste system resources. In response to determining that the first data file is smaller than the first threshold, the first data file is not further compressed. Further, after the first data file has been compressed multiple times, once the first data file needs to be used, it may take too long of a process to decompress the first data file. Therefore, after the first data file has been compressed to a certain level (for example, has been compressed with a second compression ratio), no further compression is performed on the first data file. The second compression ratio may be set according to requirements, and may be a highest ratio or any ratio In certain embodiment(s), the electronic device compresses the first data file according to the compression strategy determined at step S202.

In this way, the first parameter of the first data file is determined by the data processing method provided according to embodiment(s) of the present disclosure. According to the length of time during which the first data file remains unexecuted while the electronic device is running, a compression strategy for compressing the first data file is determined. The first data file is compressed according to the compression strategy. When the first data file has not been executed for a relatively longer time, a relatively higher compression ratio is used to compress the first data file, to avoid take-up of memory space that otherwise would be used to store the first data file that has not been used or executed. This helps save content or memory space, while without having to affect the use of other data files.

Figure 3:
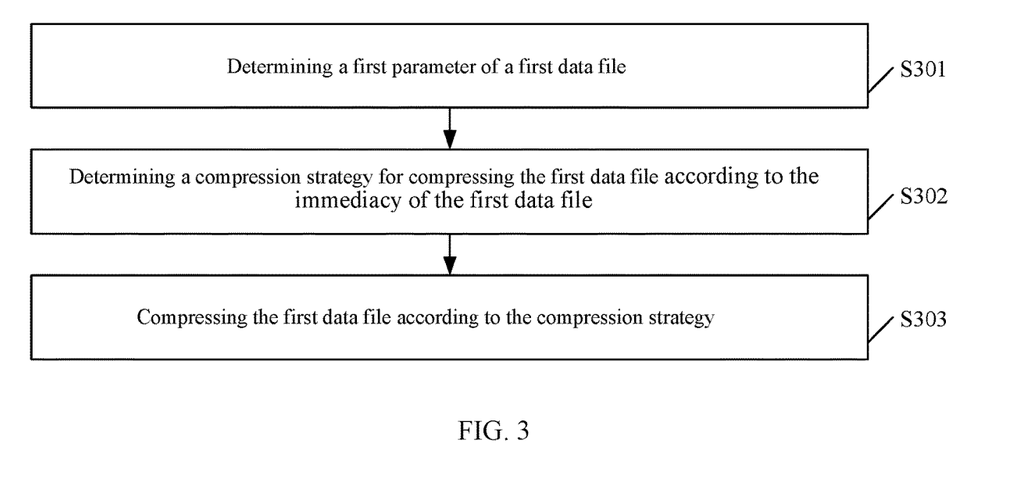
FIG. 3 is a schematic diagram of a flowchart of a data processing method according to embodiment(s) of the present disclosure.

FIG. 3 is a schematic flowchart of the data processing method according to embodiment(s) of the present disclosure, which will be described according to each step.

Step S301, determining the first parameter of the first data file.

In certain embodiment(s), the electronic device determines the first parameter of the first data file. The first data file may be a file in a system disk (for example, a C disk).

The first data file may be at least one of a third-party APP, an inbox APP, a driver file, and a data file.

In certain embodiment(s), the electronic device determines a first parameter of the first data file, where the first parameter may include an immediacy of the first data file.

The immediacy of the first data file may include a response rate of the first data file. If the immediacy of the first data file is relatively higher, it indicates a relatively faster response rate may be required when the first data file is called. The immediacy of the first data file may be set according to the type of the first data file.

Step S302, determining a compression strategy for compressing the first data file according to the immediacy of the first data file.

In certain embodiment(s), the electronic device determines a compression strategy for compressing the first data file according to the immediacy of the first data file. The first data file is compressed using different compression ratios and/or compression frequencies. The higher the immediacy of the first data file, the lower the compression ratio and/or the compression frequency.

In implementations, the electronic device may use the currently determined compression strategy to compress the first data file based on a previous compression.

In implementations, the electronic device may further determine whether the immediacy of the first data file is at first level, where the first level indicates that the immediacy of the first data file is relatively high. If the immediacy of the first data file is at the first level, the first data file is compressed using a first compression strategy, where the first compression strategy may be no compression or a relatively little compression, or may be performed using a lowest compression ratio, or may be compressed only once.

Alternatively, and in certain embodiment(s), if the immediacy of the first data file is not at the first level, the compression ratio and/or the compression frequency are determined according to the immediacy of the first data file.

For example, if the immediacy of the first data file is at a second level, the compression frequency is determined such that compression is performed in every third time length, and the compression ratio of each time may be a compression ratio corresponding to a second compression strategy, according to a compression ratio corresponding to a third compression strategy, or according to a compression ratio corresponding to a fourth compression strategy. After a third compression, a compression ration according to the fourth compression strategy may be used to conduct further compression.

In certain embodiment(s), if the immediacy of the first data file is not at the first level, the electronic device may further determine a compression strategy for compressing the first data file according to step S201 to step S202.

Step S303, compressing the first data file according to the compression strategy.

In certain embodiment(s), before compressing the first data file, the electronic device may further determine a current size of the first data file. If the first data file is smaller than a first threshold, then the first data file is not compressed. And/or, the electronic device determines a current compression ratio of the first data file. If the current compression ratio of the first data file is the second compression ratio, the first data file data is not compressed. To avoid the first data file from being compressed to a certain size, it is unnecessary to continue to perform compression, which would otherwise waste system resources. In response to determining that the first data file is smaller than the first threshold, the first data file is not further compressed.

Further, after the first data file has been compressed multiple times, once the first data file needs to be used, it may take too long of a process to decompress the first data file. If the first data file has been compressed to a certain level (for example, has been compressed using the second compression ratio), no further compression is performed on the first data file. The second compression ratio may be set according to applicable requirements, and may be a highest ratio or any ratio.

In certain embodiment(s), the electronic device compresses the first data file according to the compression strategy determined at step S302.

In this way, the first parameter of the first data file is determined by the data processing method according to certain embodiment(s) of the present disclosure. The compression strategy for compressing the first data file is determined according to the immediacy of the first data file, and the first data file is compressed according to the compression strategy. The compression strategy for compressing the first data file is determined according to the immediacy of the first data file. The first compression strategy is used for the first data file with high immediacy and other compression strategies are used for the first data file with relatively low immediacy. The compression strategy may not only ensure that the first data file with high immediacy can be used in a timely manner, but also avoid the relatively low immediacy of the first data file from occupying too much memory space. Accordingly, more content space may be saved without affecting the use of other data files.

Figure 4:
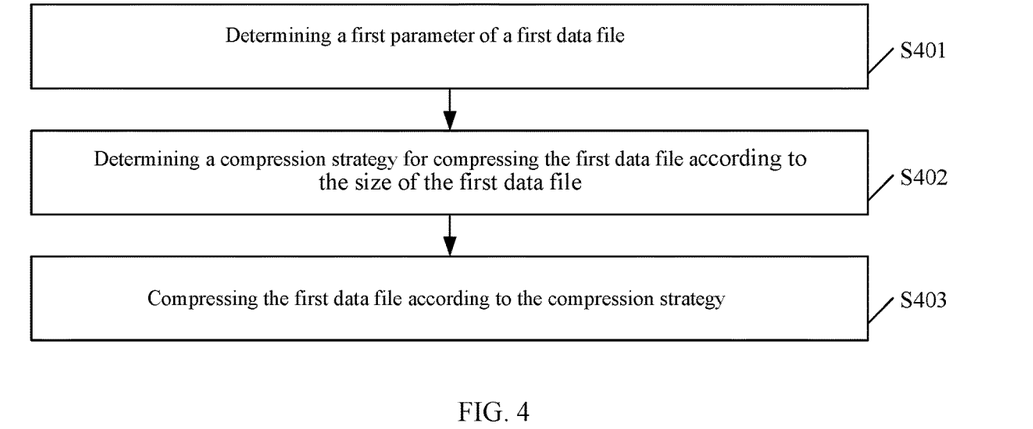
FIG. 4 is a schematic diagram of a flowchart of a data processing method according to embodiment(s) of the present disclosure.

FIG. 4 is a schematic flowchart of the data processing method according to embodiment(s) of the present disclosure, which will be described according to each step.

Step S401, determining the first parameter of the first data file.

In certain embodiment(s), the electronic device determines the first parameter of the first data file. The first data file may be a file in a system disk (for example, a C disk); the first data file may be at least one of a third-party APP, an inbox APP, a driver file, and a data file.

In certain embodiment(s), the electronic device determines a first parameter of the first data file, where the first parameter may include a size of the first data file, and the size of the first data file may be a size of the memory space occupied by the first data file.

Step S402: Determining a compression strategy for compressing the first data file according to the size of the first data file.

In certain embodiment(s), the electronic device determines a compression strategy for compressing the first data file according to the size of the first data file. Different compression ratios may be used to compress the first data file. The larger the first data file, the higher the compression frequency and/or the compression ratio.

In implementations, the electronic device may use the currently determined compression strategy to compress the first data file based on a previous compression.

In implementations, the electronic device may determine the size of the first data file according to a relationship between a size of the first data file and at least one memory threshold. The at least one memory threshold may be set according to actual requirements; for example, only one memory threshold may be set, or multiple memory thresholds may also be set.

In certain embodiment(s), the at least one memory threshold includes a first memory threshold and a second memory threshold, and the first memory threshold is smaller than the second memory threshold. When the size of the first data file is smaller than the first memory threshold, the electronic device may use the second compression strategy to compress the first data file. When the size of the first data file is greater than or equal to the first memory threshold, but is smaller than the second memory threshold, the electronic device may use the third compression strategy to compress the first data file that has been compressed using the second compression strategy. When the size of the first data file is greater than or equal to the second memory threshold, the electronic device may use the fourth compression strategy to compress the first data file that has been compressed using the second compression strategy and the third compression strategy. The compression ratio corresponding to the second compression strategy is smaller than the compression ratio corresponding to the third compression strategy, and the compression ratio corresponding to the third compression strategy is smaller than the compression ratio corresponding to the fourth compression strategy. This may be expressed as "the compression ratio corresponding to the second compression strategy<the compression ratio corresponding to the third compression strategy<the compression ratio corresponding to the fourth compression strategy."

Step S403, compressing the first data file according to the compression strategy.

In certain embodiment(s), before compressing the first data file, the electronic device may further determine the current size of the first data file, and if the first data file is smaller than a first threshold, then the first data file is not compressed. In certain embodiment(s), the electronic device determines the current compression ratio of the first data file; if the current compression ratio of the first data file is the second compression ratio, the first data file is not compressed. To avoid the first data file from being compressed to a certain size, it is unnecessary to continue to perform compression, which would otherwise cause a waste of system resources. In response to determining that the first data file is smaller than the first threshold, the first data file is not further compressed. This is to avoid a situation where after the first data file has been compressed multiple times, once the first data file needs to be used, it may take too long of a process to decompress the first data file. After the first data file has been compressed to a certain level (for example, has been compressed using the second compression ratio), no further compression is performed on the first data file. The second compression ratio may be set according to applicable requirements, and may be the highest ratio or any ratio.

In certain embodiment(s), the electronic device compresses the first data file according to the compression strategy determined at step S402.

In this way, the first parameter of the first data file is determined by the data processing method according to embodiment(s) of the present disclosure. The compression strategy for compressing the first data file is determined according to the size of the first data file; and according to the compression strategy, the first data file is compressed. For the first data file that occupies a larger memory size, a higher compression ratio is used for compression to avoid the first data file that has not been used for a long time occupying too much memory space, so as to save more content space.

Figure 5:
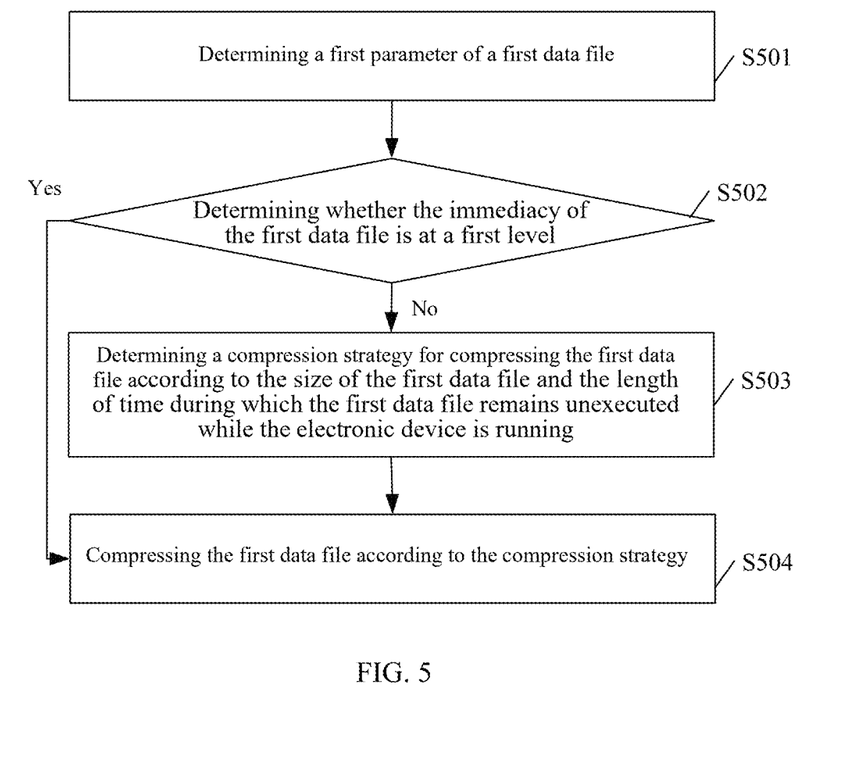
FIG. 5 is a schematic diagram of a flowchart of a data processing method according to embodiment(s) of the present disclosure.

FIG. 5 is a schematic diagram of a flowchart of the data processing method according to embodiment(s) of the present disclosure, which will be described according to each step.

Step S501, determining the first parameter of the first data file.

In certain embodiment(s), the electronic device determines the first parameter of the first data file. The first data file may be a file in a system disk (for example, a C disk). The first data file may also be at least one of a third-party APP, an inbox APP, a driver file, and a data file.

In certain embodiment(s), the electronic device determines a first parameter of the first data file, where the first parameter may include at least one of: the length of time during which the first data file remains unexecuted while the electronic device is running, the immediacy of the first data file, and the size of the first data file.

The length of time for un-execution while the electronic device is running may be the time interval from the last use of the first data file to the current time when the electronic device is powered on. The size of the first data file may be the size of the memory occupied by the first data file. The immediacy of the first data file may include the response rate of the first data file. If the immediacy of the first data file is high, it indicates that when the first data file is called, a faster response rate may be required. The immediacy of the first data file may be set according to the type of the first data file.

Step S502, determining whether the immediacy of the first data file is at a first level.

In certain embodiment(s), the electronic device determines whether the immediacy of the first data file is at the first level; if the immediacy of the first data file is at the first level, compressing the first data file with a first compression strategy. If the immediacy of the first data file is not at the first level, step S503 is performed.

Step S503, determining the compression strategy of the first data file according to the size of the first data file and the length of time that the first data file has not been executed while the electronic device is running.

In certain embodiment(s), the electronic device determines the compression frequency corresponding to the first data file according to the size of the first data file, determines the compression ratio according to the length of time that the first data file remains unexecuted while the electronic device is running, and determining the compression strategy according to the compression frequency and the compression ratio.

In certain embodiment(s), the longer the first data file remains unexecuted, the higher the compression ratio; the larger the first data file, the higher the compression frequency and/or the compression ratio.

Step S504, compressing the first data file according to the compression strategy.

In certain embodiment(s), before compressing the first data file, the electronic device may further determine a current size of the first data file. If the first data file is smaller than a first threshold, then the first data file is not compressed. And/or, the electronic device determines a current compression ratio of the first data file. If the current compression ratio of the first data file is the second compression ratio, the first data file data is not compressed. To avoid the first data file from being compressed to a certain size, it is unnecessary to continue to perform compression, which would otherwise waste system resources. In response to determining that the first data file is smaller than the first threshold, the first data file is not further compressed. Further, after the first data file has been compressed multiple times, once the first data file needs to be used, it may take too long of a process to decompress the first data file. If the first data file has been compressed to a certain level (for example, has been compressed using the second compression ratio), no further compression is performed on the first data file. The second compression ratio may be set according to applicable requirements, and may be a highest ratio or any ratio.

In certain embodiment(s), when or in response to determining the immediacy of the first data file is not at the first level, the electronic device compresses the first data file according to the compression strategy determined at step S503. Alternatively, when or in response to determining the immediacy of the first data file is at the first level, the electronic device compresses the first data file according to the compression strategy determined at step S503.

In this way, the first parameter of the first data file is determined by the data processing method according to certain embodiment(s) of the present disclosure. The compression strategy for compressing the first data file is determined according to the immediacy of the first data file, according to the size of the first data file, and according to the length of time during which the first data file remains unexecuted while the electronic device is running, and the first data file is compressed according to the compression strategy. The compression strategy for compressing the first data file is determined according to the immediacy of the first data file. The first compression strategy is used for the first data file with high immediacy and other compression strategies are used for the first data file with relatively low immediacy. The compression strategy may not only ensure that the first data file with high immediacy can be used in a timely manner, but also avoid the relatively low immediacy of the first data file from occupying too much memory space. Accordingly, more content space may be saved without affecting the use of other data files.

Figure 6:
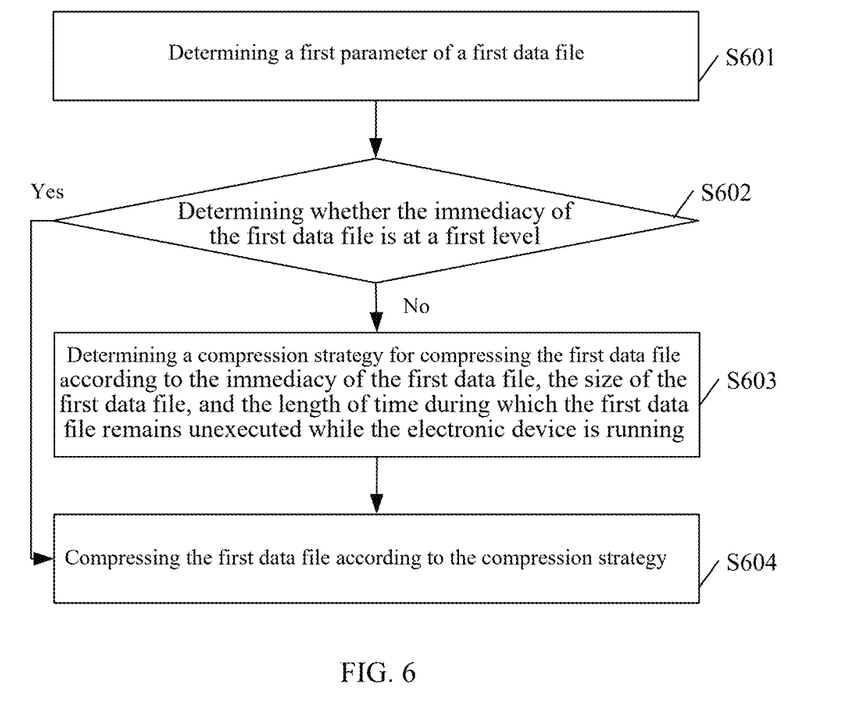
FIG. 6 is a schematic diagram of a flowchart of a data processing method according to embodiment(s) of the present disclosure.

FIG. 6 is a schematic diagram of a flowchart of the data processing method according to embodiment(s) of present disclosure, which will be described according to each step.

Step S601, determining the first parameter of the first data file.

In certain embodiment(s), the electronic device determines the first parameter of the first data file. The first data file may be a file in a system disk (for example, a C disk). The first data file may also be at least one of a third-party APP, an inbox APP, a driver file, and a data file.

In certain embodiment(s), the electronic device determines a first parameter of the first data file, where the first parameter may include at least one of: the length of time during which the first data file remains unexecuted while the electronic device is running, the immediacy of the first data file, and the size of the first data file.

The length of time for un-execution while the electronic device is running may be the time interval from the last use of the first data file to the current time when the electronic device is powered on. The size of the first data file may be the size of the memory occupied by the first data file. The immediacy of the first data file may include the response rate of the first data file. If the immediacy of the first data file is high, it indicates that when the first data file is called, a faster response rate may be required. The immediacy of the first data file may be set according to the type of the first data file.

Step S602, determining whether the immediacy of the first data file is at the first level.

In certain embodiment(s), the electronic device determines whether the immediacy of the first data file is at the first level; if the immediacy of the first data file is at the first level, compressing the first data file with a first compression strategy; and if the immediacy of the first data file is not at the first level, step S603 is performed.

Step S603, determining the compression strategy of the first data file according to the immediacy, the size of the first data file, and the length of time that the first data file remains unexecuted while the electronic device is running.

In certain embodiment(s), the electronic device determines the compression frequency of the first data file according to the immediacy of the first data file, the compression ratio of the first data file is determined according to the length of time of un-execution while the electronic device is running and according to the size of the first data file. The compression strategy for compressing the first data file is determined according to the compression frequency and the compression ratio.

In certain embodiment(s), the lower the immediacy of the first data file, the higher the compression frequency. The longer the length of time that the first data file remains unexecuted and the larger the first data file, the higher the compression ratio.

Step S604, compressing the first data file according to the compression policy.

In certain embodiment(s), before compressing the first data file, the electronic device may further determine a current size of the first data file, and if the first data file is smaller than a first threshold, then the first data file is not compressed. And/or, the electronic device determines a current compression ratio of the first data file; if the current compression ratio of the first data file is a second compression ratio, the first data file is not compressed. To prevent the first data file from being compressed to a certain size, it is unnecessary to continue to perform compression, which may otherwise waste system resources. In response to determining that the first data file is smaller than the first threshold, the first data file is not further compressed. Further, after the first data file has been compressed multiple times, once the first data file needs to be used, it may take too long of a process to decompress the first data file. Therefore, after the first data file has been compressed to a certain level (for example, has been compressed with a second compression ratio), no further compression is performed on the first data file. The second compression ratio may be set according to requirements, and may be a highest ratio or any ratio.

In certain embodiment(s), when or in response to determining the immediacy of the first data file is not at the first level, the electronic device compresses the first data file according to the compression strategy determined at step S603. Alternatively, when or in response to determining the immediacy of the first data file is at the first level, the electronic device compresses the first data file according to the compression policy determined at step S602

In this way, the first parameter of the first data file is determined by the data processing method according to certain embodiment(s) of the present disclosure. The compression strategy for compressing the first data file is determined according to the immediacy of the first data file, according to the size of the first data file, and according to the length of time during which the first data file remains unexecuted while the electronic device is running, and the first data file is compressed according to the compression strategy. The compression strategy for compressing the first data file is determined according to the immediacy of the first data file. The first compression strategy is used for the first data file with high immediacy and other compression strategies are used for the first data file with relatively low immediacy. The compression strategy may not only ensure that the first data file with high immediacy can be used in a timely manner, but also avoid the relatively low immediacy of the first data file from occupying too much memory space. Accordingly, more content space may be saved without affecting the use of other data files.

Figure 7:
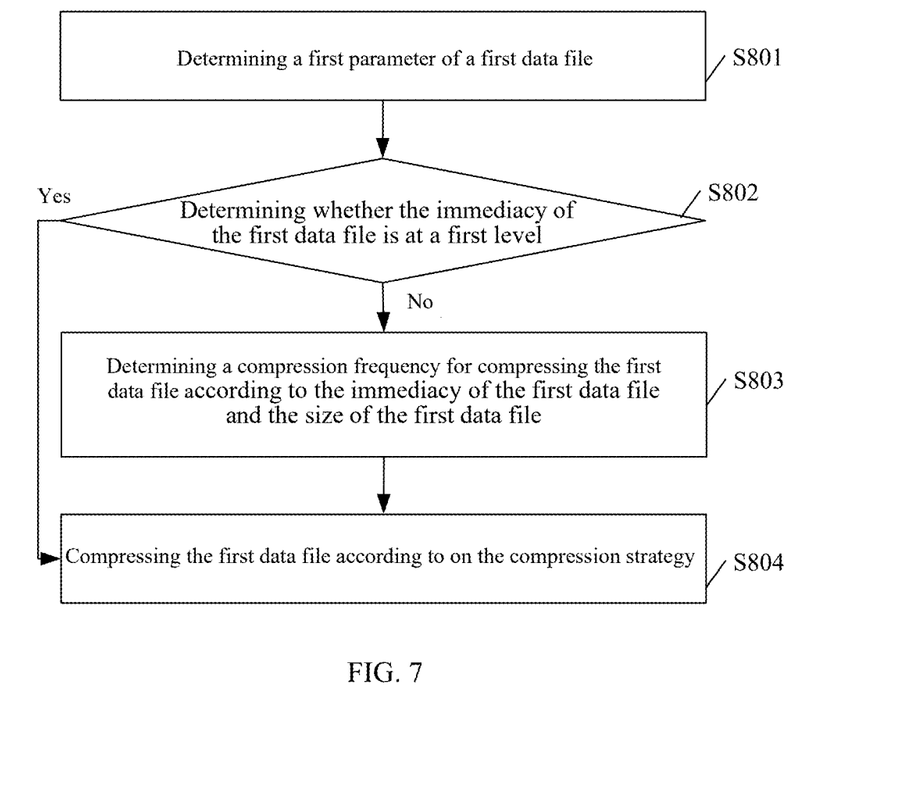
FIG. 7 is a schematic diagram of a flowchart of a data processing method according to embodiment(s) of the present disclosure.

FIG. 7 is a schematic flowchart of the data processing method provided according to embodiment(s) of the present disclosure, which will be described according to each step.

Step S801, determining the first parameter of the first data file.

In certain embodiment(s), the electronic device determines the first parameter of the first data file. The first data file may be a file in a system disk (for example, a C disk); the first data file may be at least one of a third-party APP, an inbox APP, a driver file, and a data file.

In certain embodiment(s), the electronic device determines a first parameter of the first data file, where the first parameter may include at least one of: the length of time during which the first data file remains unexecuted while the electronic device is running, the immediacy of the first data file, and the size of the first data file.

The length of time for un-execution while the electronic device is running may be the time interval from the last use of the first data file to the current time when the electronic device is powered on. The size of the first data file may be the size of the memory occupied by the first data file. The immediacy of the first data file may include the response rate of the first data file. If the immediacy of the first data file is high, it indicates that when the first data file is called, a faster response rate may be required. The immediacy of the first data file may be set according to the type of the first data file.

Step S802, determining whether the immediacy of the first data file is at the first level.

In certain embodiment(s), the electronic device determines whether the immediacy of the first data file is at the first level; if the immediacy of the first data file is at the first level, compressing the first data file with a first compression strategy. If the immediacy of the first data file is not the first level, step S803 is performed.

Step S803, determining the compression frequency corresponding to the first data file, according to the immediacy of the first data file and the size of the first data file.

In certain embodiment(s), the electronic device determines the compression frequency corresponding to the first data file according to the immediacy of the first data file and the size of the first data file. The electronic device determines the compression ratio according to the length of time that the first data file remains unexecuted while the electronic device is running. The compression strategy is determined according to the compression frequency and the compression ratio.

In certain embodiment(s), the lower the immediacy of the first data file and the larger the size of the first data file, the higher the compression frequency. The longer the length of time that the first data file remains unexecuted, the higher the compression ratio.

Step S804, compressing the first data file according to the compression strategy.

In certain embodiment(s), before compressing the first data file, the electronic device may further determine a current size of the first data file, and if the first data file is smaller than a first threshold, then the first data file is not compressed. And/or, the electronic device determines a current compression ratio of the first data file; if the current compression ratio of the first data file is a second compression ratio, the first data file is not compressed. In order to prevent the first data file from being compressed to a certain size, it is unnecessary to continue to perform compression, which may otherwise waste system resources. In response to determining that the first data file is smaller than the first threshold, the first data file is not further compressed. Further, after the first data file has been compressed multiple times, once the first data file needs to be used, it may take too long of a process to decompress the first data file. Therefore, after the first data file has been compressed to a certain level (for example, has been compressed with a second compression ratio), no further compression is performed on the first data file. The second compression ratio may be set according to requirements, and may be a highest ratio or any ratio.

In certain embodiment(s), when or in response to determining the immediacy of the first data file is not at the first level, the electronic device compresses the first data file according to the compression strategy determined at step S803. Alternatively, when or in response to determining the immediacy of the first data file is at the first level, the electronic device compresses the first data file according to the compression policy determined at step S802.

In this way, the first parameter of the first data file is determined by the data processing method according to certain embodiment(s) of the present disclosure. The compression strategy for compressing the first data file is determined according to the immediacy of the first data file, according to the size of the first data file, and according to the length of time during which the first data file remains unexecuted while the electronic device is running, and the first data file is compressed according to the compression strategy. The compression strategy for compressing the first data file is determined according to the immediacy of the first data file. The first compression strategy is used for the first data file with high immediacy and other compression strategies are used for the first data file with relatively low immediacy. The compression strategy may not only ensure that the first data file with high immediacy can be used in a timely manner, but also avoid the relatively low immediacy of the first data file from occupying too much memory space. Accordingly, more content space may be saved without affecting the use of other data files.

In certain embodiment(s), data processing methods according to steps S101 to S103, S201 to S203, S301 to S303, S401 to S403, S501 to S504, S601 to S604, and S801 to S804 may all be applied to the Compact OS. In certain embodiment(s), the Compact OS adopts the compact.exe compression deployment system, and the default compression ratio of the Compact is XPRESS4K (the default algorithm of the Compact OS; the compression ratio is the lowest and the speed is the fastest). In addition, XPRESS8K, XPRESS16K and LZX (the highest compression rate and the slowest speed) are supported. The data processing method may be applied to the electronic device that uses Compact OS to compress files, such that the system occupies less controls, users get a better experience, and the method is also applicable to Android system.

Figure 8:
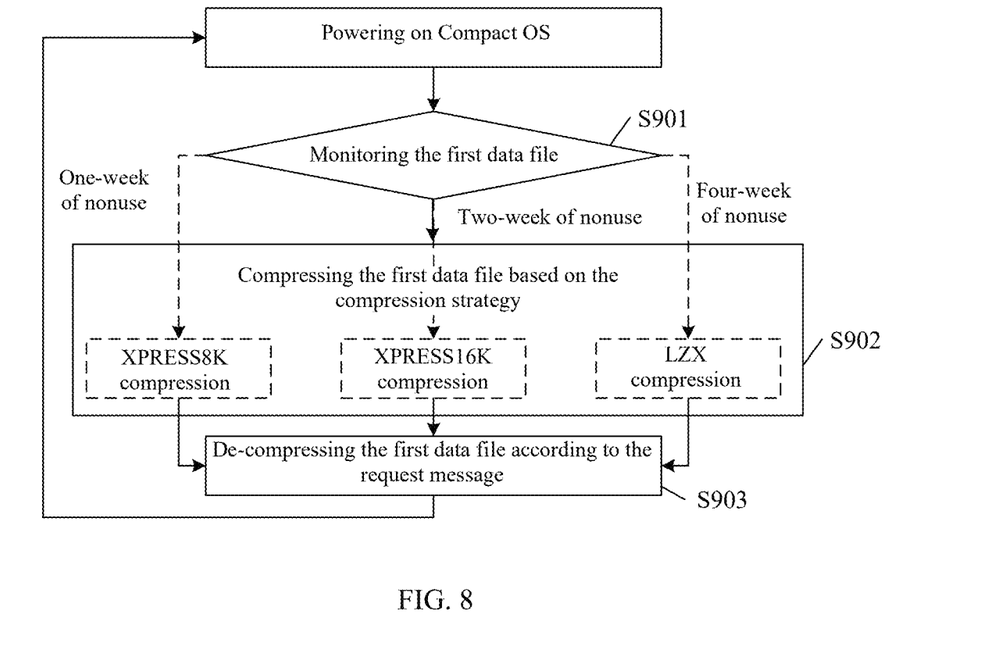
FIG. 8 is a schematic diagram of a flowchart of a data processing method according to embodiment(s) of the present disclosure.

FIG. 8 is a schematic diagram of a flowchart of the data processing method according to embodiment(s) of the present disclosure, which will be described according to each step.

Step S901, monitoring the first data file.

In certain embodiment(s), the electronic device may include a monitoring unit, and when the CompactOS is turned on and running, the monitoring unit monitors the frequency of use of the first data file. If the first data file has not been used for a week, it is determined that the compression strategy of the first data file is XPRESS8K. If the first data file has not been used for two weeks, it is determined that the compression strategy of the first data file is XPRESS16K. If the first data file has not been used for four weeks, it is determined that the compression strategy of the first data file is a data compression algorithm (LZX).

In certain embodiment(s), the electronic device may determine a first data file, where the first data file may be a file in a system disk (for example, a C disk) that may be compressed. The first data file may also be at least one of a third-party file, an inbox APP, a driver file, and a data file. In certain embodiment(s), the first data file does not include data files related to system performance to ensure system performance. The first data file may also be a data file whose size is greater than the fourth memory threshold.

In certain embodiment(s), after the electronic device determines the first data file, the first data file may also be added to a to-be-compressed list. The compact.exe file may be opened through IDA to confirm the to-be-compressed list.

The first data file supports at least one compression; and a subsequent compression is performed on the basis of a previous compression.

Step S902, compressing the first data file according to the compression policy.

In certain embodiment(s), the electronic device compresses the first data file according to the compression strategy determined at step S901.

In certain embodiment(s), the first data file is compressed and stored in a main system disk of the electronic device.

Step S903, the first data file is decompressed according to a request message.

In certain embodiment(s), the apparatus receives a request message, where the request message is used to request execution of a first data file; in response to the request message, a first compression policy corresponding to the first data file is detected. If the compression strategy does not satisfy a first condition, the first data file compressed by the first compression strategy is decompressed, such that the decompressed first data file satisfies the first condition. The first condition is that the first data file is not compressed or the first data file is compressed according to a default compression policy.

In this way, through the data processing method according to embodiment(s) of the present disclosure, the first data file is monitored; the first data file is compressed according to the compression strategy; when a request message for executing the first data file is received, the first data file is decompressed according to the request message. For the first data file that has not been used or executed for a longer time, use a higher compression ratio to compress the first data file that has not been used or executed for a long time, to avoid too much memory space being taken up by the first data file, and to save memory space without affecting the use of other data files. When requested to be executed, the first data file is decompressed to the default compression state, which does not affect the use performance.

Figure 9:
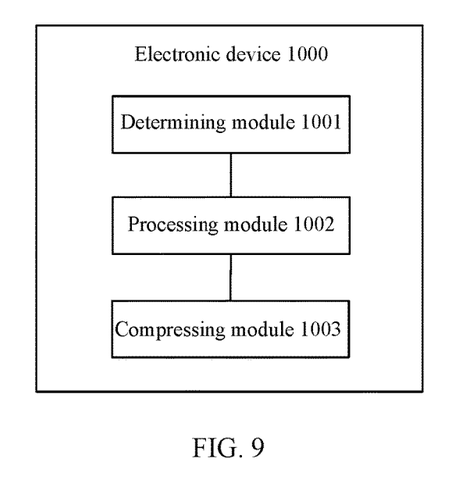
FIG. 9 is an optional schematic structural diagram of an electronic device according to embodiment(s) of the present disclosure.

FIG. 9 is a schematic structural diagram of an electronic device according to embodiment(s) of the present disclosure, which will be described according to each part.

In certain embodiment(s), the electronic device 1000 includes a determination module 1001, a processing module 1002, and a compressing module 1003.

The determining module 1001 is configured to determine the first parameter of the first data file.

The processing module 1002 is configured to determine a compression strategy for compressing the first data file according to the first parameter.

The compressing module 1003 is configured to compress the first data file according to the compression strategy.

The first parameter includes at least one of: a length of time during which the first data file remains unexecuted while the electronic device 1000 is running, the immediacy or priority of the first data file, and the size of the first data file.

In certain embodiment(s), the compression strategy is a strategy for compressing the first data file with different compression ratios and/or frequencies according to the first parameter of the first data file.

The processing module 1002 is configured to use different compression ratios to compress the first data file, according to the length of time that the first data file remains unexecuted while the electronic device 1000 is running.

The longer the length of time that the first data file remains unexecuted, the higher the compression ratio.

The processing module 1002 is configured to use different compression ratios and/or compression frequencies to compress the first data file according to the immediacy of the first data file.

The higher the immediacy of the first data file, the lower the compression ratio and/or the compression frequency.

The processing module 1002 is configured to use different compression frequencies and/or compression frequencies to compress the first data file according to the size of the first data file.

The larger the first data file, the higher the compression frequency and/or the compression ratio.

The processing module 1002 is configured to compress the first data file with a first compression strategy if the immediacy of the first data file is at the first level; otherwise, the compression frequency corresponding to the first data file is determined according to the size of the first data file.

The compression ratio of the first data file is determined according to the length of time that the first data file remains unexecuted while the electronic device 1000 is running. The compression strategy is determined according to the compression ratio and the compression frequency.

The processing module 1002 is configured to compress the first data file with a first compression strategy if the immediacy of the first data file is at the first level; otherwise, the compression frequency is determined according to the immediacy of the first data file.

The compression ratio of the first data file is determined according to the length of time that the first data file remains unexecuted while the electronic device 1000 is running and according to the size of the first data file.

A compression strategy for compressing the first data file is determined according to the compression frequency and the compression ratio.

The processing module 1002 is configured to compress the first data file with a first compression strategy if the immediacy of the first data file is at the first level; otherwise, the compression frequency is determined according to the immediacy of the first data file and according to the size of the first data file. The compression ratio is determined according to the length of time that the first data file remains unexecuted while the electronic device 1000 is running. The compression strategy for the first data file is determined according to the compression frequency and the compression ratio.

In certain embodiment(s), the data processing algorithms executed by the data processing apparatus are applied to a compact operating system.

Figure 10:
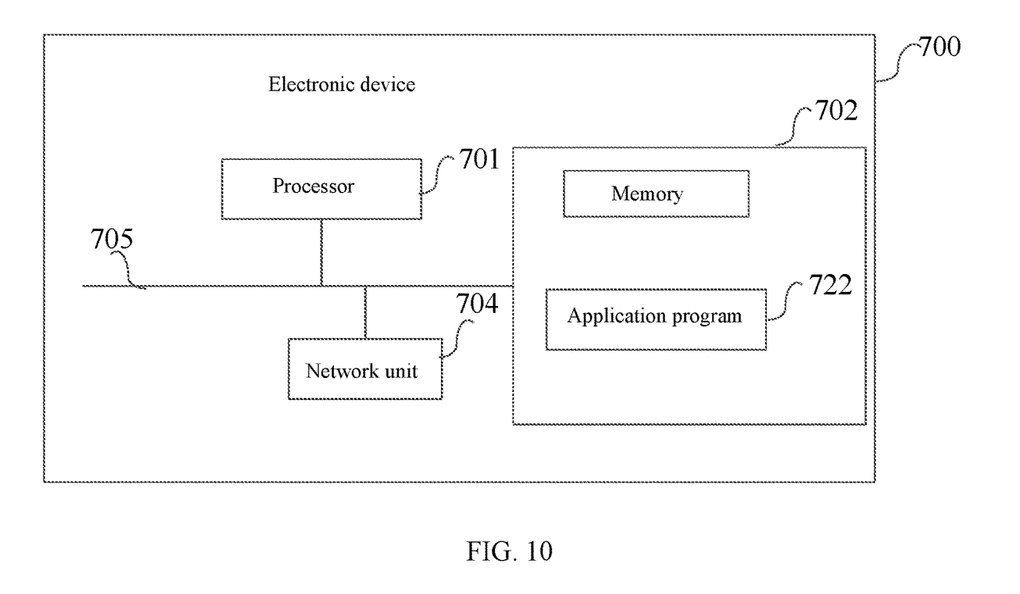
FIG. 10 is a schematic diagram of a hardware composition structure of an electronic device according to embodiment(s) of the present disclosure.

FIG. 10 is a schematic diagram of a hardware structure of an electronic device according to embodiment(s) of the present disclosure. The electronic device 700 includes: at least one processor 701, memory 702, and at least one network unit 704. The various components in electronic device 700 are coupled together by bus system 705. It is understood that the bus system 705 is used to implement the connection communication between these components. In addition to the data bus, the bus system 705 also includes a power bus, a control bus, and a status signal bus. However, for clarity of illustration, the various buses are labeled as bus system 705 in FIG. 10.

The memory 702 may be volatile memory or non-volatile memory, and may include both volatile and non-volatile memory. Among them, the non-volatile memory may be ROM, Programmable Read-Only Memory (PROM, Programmable Read-Only Memory), Erasable Programmable Read-Only Memory (EPROM, Erasable Programmable Read-Only Memory), Electrically Erasable Programmable Read-Only Memory Programmable Read-Only Memory (EEPROM, Electrically Erasable Programmable Read-Only Memory), Magnetic Random Access Memory (FRAM, ferromagnetic random access memory), Flash Memory (Flash Memory), Magnetic Surface Memory, Optical Disc, or read-only Optic Disc (CD-ROM, Compact Disc Read-Only Memory). Magnetic surface memory may be disk memory or tape memory. The volatile memory may be Random Access Memory (RAM, Random Access Memory), which is used as an external cache memory. By way of example and not as limitation, many forms of RAM are available, such as Static Random Access Memory (SRAM), Synchronous Static Random Access Memory (SSRAM), Dynamic Random Access Memory Memory (DRAM, Dynamic Random Access Memory), Synchronous Dynamic Random Access Memory (SDRAM), Double Data Rate Synchronous Dynamic Random Access Memory (DDRSDRAM), Enhanced Type Synchronous Dynamic Random Access Memory (ESDRAM), SyncLink Dynamic Random Access Memory (SLDRAM), Direct Memory Bus Random Access Memory (DRRAM). The memory 702 described in the embodiment(s) of the present disclosure includes, but is not limited to, these and any other suitable types of memory The memory 702 in the embodiment(s) of the present disclosure is used to store various types of data to support the operation of the electronic device 700. Examples of such data include: any computer program used to operate on electronic device 700, such as application program 722. A program for implementing the methods of the embodiment(s) of the present disclosure may be included in the application program 722.

The methods disclosed in the embodiment(s) of the present disclosure may be applied to the processor 701 or implemented by the processor 701. The processor 701 may be an integrated circuit chip with signal processing capability. In the implementation process, each step of the method may be completed through the hardware integrated logic circuit in the processor 701 or the instructions in the form of software. The processor 701 may be a general-purpose processor, a digital signal processor (DSP), or other programmable logic devices, discrete gate or transistor logic devices, discrete hardware components, and the like. The processor 701 may implement or execute the methods, steps, and logical block diagrams disclosed in the embodiment(s) of the present disclosure. A general purpose processor may be a microprocessor or any conventional processor or the like. The steps of the methods disclosed in the embodiment(s) of the present disclosure may be directly executed by a hardware decoding processor, or executed by a combination of hardware and software modules in the decoding processor. The software module may be located in a storage medium, the storage medium is located in the memory 702, and the processor 701 reads the information in the memory 702, and performs the method steps in combination with its hardware.

In certain embodiment(s), the electronic device 700 may be implemented by one or more Application Specific Integrated Circuit (ASIC), DSP, Programmable Logic Device (PLD), Complex Programmable Logic Device (CPLD), FPGA, general-purpose processor, controller, MCU, MPU, or other electronic component implementation for performing the method.

In addition to the methods and apparatuses described herein, embodiment(s) of the present disclosure may also be computer program products including computer program instructions that, when executed by a processor, cause the processor to perform the method described herein according to various embodiments of the present disclosure.

The computer program product can write program codes for performing the operations of the embodiment(s) of the present disclosure in any combination of one or more programming languages, including object-oriented programming languages, such as Java, C++, etc. The program language may also include procedural programming languages, such as "C" language or similar programming languages. The program code may be executed entirely on a user's computing device, partly on the user's device, as a stand-alone software package, partly on the user's computing device and partly on a remote computing device, or entirely on the remote computing device or a server.

In addition, embodiment(s) of the present disclosure may also provide computer-readable storage media having computer program instructions stored thereon, the computer program instructions, when executed by a processor, cause the processor to perform the method described herein according to embodiment(s) of the present disclosure.

The computer-readable storage medium may employ any combination of one or more readable media. The readable medium may be a readable signal medium or a readable storage medium. The readable storage medium may include, for example, but not limited to, electrical, magnetic, optical, electromagnetic, infrared, or semiconductor systems, apparatuses or devices, or any combination thereof. More specific examples (non-exhaustive list) of readable storage media include: electrical connections with one or more wires, portable disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination thereof.

The basic principles of the present disclosure have been described herein in conjunction with various embodiments. However, benefits, advantages, and effects reflected in the present disclosure are only examples rather than limitations, and these benefits, advantages, and effects should not be considered to be required for each embodiment of the present disclosure. In addition, the details disclosed herein are only for the role of examples and the role of facilitating understanding, and are not for limiting. The details do not necessarily cast a limit to the embodiment(s) of the present disclosure.

The block diagrams of devices, apparatus, and systems referred to in the present disclosure are merely illustrative examples and are not intended to require or imply that the connections, arrangements, or configurations must be in the manner shown in the block diagrams. As those skilled in the art will appreciate, these components, devices, apparatuses, and systems may be connected, arranged, and configured in any suitable manner. Words such as "comprising", "including", "having" and the like are open-ended words meaning "including but not limited to" and may be used interchangeably among them. As used herein, the words "or" and "and" may refer to or be used interchangeably with the word "and/or" unless the context clearly dictates otherwise. As used herein, the term "such as" may refer to and be used interchangeably with the term "such as but not limited to".

It should also be pointed out that, in the apparatus, equipment and method of the present disclosure, each component or each step may be de-assembled and/or re-assembled. These de-assembly and/or re-assembly may be considered as included in the present disclosure The description is provided to enable any person skilled in the art to make or use embodiment(s) of the present disclosure. Various modifications may be readily apparent to those skilled in the art, and the generic principles reflected herein may be applied to other aspects without departing from the scope of the present disclosure. Therefore, the present disclosure is not intended to be limited to the aspects shown herein but is to be accorded the widest scope consistent with the principles and novel features disclosed herein.

The description has been presented for the purposes of illustration and description. Furthermore, this description is not intended to limit the embodiment(s) of the present disclosure to the forms disclosed herein. Although a number of example aspects and embodiments have been discussed above, those skilled in the art will recognize certain variations, modifications, changes, additions and sub-combinations thereof.

What is claimed is:

1. A data processing method comprising:
   determining a first parameter of a first data file, the first parameter including a length of time during which the first data file remains unexecuted while an electronic device is running and an immediacy of the first data file;
   determining a compression strategy for compressing the first data file according to the first parameter, including:
     in response to determining that the immediacy of the first data file is at a first level, determining a first compression strategy as the compression strategy for compressing the first data file; and
     in response to determining that the immediacy of the first data file is not at the first level:
       determining a compression frequency corresponding to the first data file according to at least one of the immediacy of the first data file or a size of the first data file;
       determining a compression ratio of the first data file according to the length of time during which the first data file remains unexecuted while the electronic device is running; and
       determining a second compression strategy as the compression strategy for compressing the first data file according to the compression ratio and the compression frequency; and
   compressing the first data file according to the compression strategy,
   wherein the immediacy of the first data file indicating a response rate of the first data file when the first data file is called, and a higher immediacy corresponding to a faster response rate.

2. The method of claim 1, wherein the first compression strategy and the second compression strategy are strategies for compressing the first data file with different compression ratios and/or frequencies according to the first parameter of the first data file.

3. The method according to claim 1, wherein the longer the length of time during which the first data file remains unexecuted, the higher the compression ratio.

4. The method according to claim 1, wherein
   the higher the immediacy of the first data file, the lower the compression ratio and/or the compression frequency.

5. The method according to claim 1, wherein
   the larger the size of the first data file, the higher the compression frequency and/or the compression ratio.

6. The method according to claim 1, wherein
   in response to determining the immediacy of the first data file is not at the first level, determining the compression frequency corresponding to the first data file according to at least one of the immediacy of the first data file or the size of the first data file includes:
     determining the compression frequency corresponding to the first data file according to the size of the first data file.

7. The method according to claim 1, wherein
   in response to determining the immediacy of the first data file is not at the first level, determining the compression ratio of the first data file includes:
     determining the compression ratio of the first data file according to the length of time during which the first data file remains unexecuted while the electronic device is running and according to the size of the first data file.

8. The method according to claim 1, wherein
   in response to determining the immediacy of the first data file is not at the first level, determining the compression frequency corresponding to the first data file according to at least one of the immediacy of the first data file or the size of the first data file includes:
     determining the compression frequency corresponding to the first data file according to the immediacy of the first data file and according to the size of the first data file.

9. The method according to claim 1, wherein the data processing method is applied to a compact operating system (Compact OS).

10. An audio processing apparatus, comprising: a memory storing computer program instructions; and a processor coupled to the memory and configured to execute the computer program instructions and perform:
    determining a first parameter of a first data file, the first parameter including a length of time during which the first data file remains unexecuted while an electronic device is running and an immediacy of the first data file;
    determining a compression strategy for compressing the first data file according to the first parameter, including:
      in response to determining that the immediacy of the first data file is at a first level, determining a first compression strategy as the compression strategy for compressing the first data file; and
      in response to determining that the immediacy of the first data file is not at the first level:
        determining a compression frequency corresponding to the first data file according to at least one of the immediacy of the first data file or a size of the first data file;
        determining a compression ratio of the first data file according to the length of time during which the first data file remains unexecuted while the electronic device is running; and
determining a second compression strategy as the compression strategy for compressing the first data file according to the compression ratio and the compression frequency; and
compressing the first data file according to the compression strategy,
wherein the immediacy of the first data file indicating a response rate of the first data file when the first data file is called, and a higher immediacy corresponding to a faster response rate.

11. The audio processing apparatus of claim 10, wherein the first compression strategy and the second compression strategy are strategies for compressing the first data file with different compression ratios and/or frequencies according to the first parameter of the first data file.

12. The audio processing apparatus of claim 10, wherein the longer the length of time during which the first data file remains unexecuted, the higher the compression ratio.

13. The audio processing apparatus of claim 10, wherein the higher the immediacy of the first data file, the lower the compression ratio and/or the compression frequency.

14. The audio processing apparatus of claim 10, wherein the larger the size of the first data file, the higher the compression frequency and/or the compression ratio.

15. The audio processing apparatus of claim 10, wherein in response to determining the immediacy of the first data file is not at the first level, determining the compression frequency corresponding to the first data file according to at least one of the immediacy of the first data file or the size of the first data file includes:
determining the compression frequency corresponding to the first data file according to the size of the first data file.

16. The audio processing apparatus of claim 10, wherein in response to determining the immediacy of the first data file is not at the first level, determining the compression ratio of the first data file includes:
determining the compression ratio of the first data file according to the length of time during which the first data file remains unexecuted while the electronic device is running and according to the size of the first data file.

17. The audio processing apparatus of claim 10, wherein in response to determining the immediacy of the first data file is not at the first level, determining the compression frequency corresponding to the first data file according to at least one of the immediacy of the first data file or the size of the first data file includes:
determining the compression frequency corresponding to the first data file according to the immediacy of the first data file and according to the size of the first data file.

18. The audio processing apparatus of claim 10, wherein the data processing method is applied to a compact operating system (Compact OS).

19. A non-transitory computer-readable storage medium storing computer program instructions executable by at least one processor to perform:
determining a first parameter of a first data file;
determining a compression strategy for compressing the first data file according to the first parameter; and
compressing the first data file according to the compression strategy,
wherein the first parameter includes a length of time during which the first data file remains unexecuted while an electronic device is running, and an immediacy of the first data file; and
wherein determining the compression strategy further includes:
in response to determining that the immediacy of the first data file is at the first level, determining a first compression strategy as the compression strategy for compressing the first data file; and
in response to determining that the immediacy of the first data file is not at the first level:
determining a compression frequency corresponding to the first data file according to at least one of the immediacy of the first data file or a size of the first data file;
determining a compression ratio of the first data file according to the length of time during which the first data file remains unexecuted while the electronic device is running; and
determining, according to the compression ratio and the compression frequency of the first data file, a second compression strategy as the compression strategy for compressing the first data file.

* * * * *